United States Patent
Jones, II et al.

(10) Patent No.: US 11,247,727 B2
(45) Date of Patent: Feb. 15, 2022

(54) SAFETY-ENHANCED STORAGE SYSTEM FOR AUTONOMOUS VEHICLE COMPUTE UNITS

(71) Applicant: Woven Planet North America, Inc., Los Altos, CA (US)

(72) Inventors: Alfred Charles Jones, II, San Jose, CA (US); Steven Son Khau, Belmont, CA (US); Azhar Kamal Meyer, Pacifica, CA (US); Hannah Samantha Talisse, Redwood City, CA (US)

(73) Assignee: Woven Planet North America, Inc., Los Altos, CA (US)

(*) Notice: Subject to any disclaimer, the term of this patent is extended or adjusted under 35 U.S.C. 154(b) by 132 days.

(21) Appl. No.: 16/700,945

(22) Filed: Dec. 2, 2019

(65) Prior Publication Data

US 2021/0163070 A1    Jun. 3, 2021

(51) Int. Cl.
*B62D 21/15* (2006.01)
*B62D 21/09* (2006.01)
(Continued)

(52) U.S. Cl.
CPC ........... *B62D 21/152* (2013.01); *B62D 21/09* (2013.01); *B62D 21/15* (2013.01); *B62D 21/157* (2013.01);
(Continued)

(58) Field of Classification Search
CPC ...... B62D 21/152; B62D 21/09; B62D 27/06; B62D 27/026; B62D 25/08; B62D 21/157; B62D 21/15
(Continued)

(56) References Cited

U.S. PATENT DOCUMENTS

| 7,066,515 B2* | 6/2006 | Pierce | B60R 19/00 180/68.5 |
| 7,717,207 B2* | 5/2010 | Watanabe | B60L 50/66 180/68.5 |

(Continued)

FOREIGN PATENT DOCUMENTS

| EP | 1604871 A1 | 12/2005 |
| JP | 2012076540 A | 4/2012 |
| JP | 2017132376 A | 8/2017 |

OTHER PUBLICATIONS

International Search Report and Written Opinion for International Application No. PCT/US2020/062724, dated Mar. 9, 2021.

*Primary Examiner* — D Glenn Dayoan
*Assistant Examiner* — Dana D Ivey
(74) *Attorney, Agent, or Firm* — Christopher G. Darrow; Darrow Mustafa PC (57) ABSTRACT

In one embodiment, a storage system includes one or more platforms to stow compute units of an autonomous or semi-autonomous vehicle in a storage compartment of the vehicle. The platform is configured to support a compute unit of the vehicle to avoid a crumple zone of the vehicle. The crumple zone of the vehicle is designed to crumple when colliding with an object. The storage system also includes one or more shear fasteners configured to fasten the compute unit to the platform. The one or more shear fasteners are configured to break in a predetermined direction in response to a predetermined amount of lateral force. The breakage of the one or more shear fasteners decouples the compute unit from the platform in a controlled direction.

18 Claims, 8 Drawing Sheets

(51) Int. Cl.
 *B62D 27/06* (2006.01)
 *B62D 27/02* (2006.01)
 *B62D 25/08* (2006.01)

(52) U.S. Cl.
 CPC ............ *B62D 25/08* (2013.01); *B62D 27/026* (2013.01); *B62D 27/06* (2013.01)

(58) Field of Classification Search
 USPC .................................................. 296/187.11
 See application file for complete search history.

(56) References Cited

U.S. PATENT DOCUMENTS

| | | | |
|---|---|---|---|
| 9,873,456 B2 * | 1/2018 | Hara | B62D 25/2072 |
| 2009/0242298 A1 | 10/2009 | Guss | |
| 2017/0029034 A1 | 2/2017 | Faruque | |
| 2018/0304929 A1 * | 10/2018 | Nishiumi | B62D 21/152 |

\* cited by examiner

SAFETY-ENHANCED STORAGE SYSTEM FOR AUTONOMOUS VEHICLE COMPUTE UNITS

BACKGROUND

Vehicles are designed to have "crumple zones" in certain regions around its body to enhance passenger safety in the event of collisions. The crumple zone is designed with a material structure that deforms in a predictable manner when a lateral force is applied to it. For example, the rear of a vehicle is configured to have a crumple zone due to the possibility of a rear collision by another vehicle. Upon impact, the vehicle's structural deformation absorbs the energy from the impact, rather than having that energy transmitted to the passengers, fuel tank, or other sensitive systems or components of the vehicle. Additionally, the rear crumple zone acts as a buffer between, for example, one or more of the vehicle's safety critical components (e.g., fuel system components, exhaust system components, batteries, radiator and similar temperature control components, fluid storage and control components, refrigerants and similar automotive chemical compounds, heated wiring, and so forth) and the source of impact to avoid damaging the aforementioned safety critical components in the event of a lateral or rear-end impact of the vehicle. In this manner, the crumple zone ensures the integrity of the vehicle's safety critical components and increases the overall safety of the vehicle in the event of a collision.

DESCRIPTION OF EXAMPLE EMBODIMENTS

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Autonomous and semi-autonomous vehicles rely extensively on on-board compute units for processing sensor data and performing the prediction, planning, and control functions suitable for autonomous or semi-autonomous vehicle operation. The computing power available for these functions is proportional to the amount of space available for the on-board compute units. Thus, the compute unit of an autonomous or semi-autonomous vehicle is typically installed in its front or rear cabin area where space is more plentiful. However, if improperly placed in the vehicle, the compute unit, due to its mass, could undermine the vehicle's crumple zone. Thus, what is provided and disclosed herein is a system for on-board storage of an autonomous or semi-autonomous vehicle compute unit that satisfies the dual constraints of maximized compute unit size while still maintaining critical safety aspects of the vehicle. These safety aspects include satisfying two constraints in the case of a vehicle collision, namely: a) maintaining the integrity of the vehicle fuel tank, and b) minimizing the chance of the compute units potentially colliding and/or causing harm with passengers that may be seated near the compute system.

Compute units for autonomous or semi-autonomous vehicles include CPUs, GPUs, FPGAs or other types of computing systems placed on-board the autonomous vehicle. Compute units are tasked with performing functions associated with navigation of the vehicle, such as processing sensor data, prediction, planning, and control. The computational power suitable to perform these tasks with sufficiently high data capacity and low latency often means that the compute units take up considerable space and have a high total mass. As an example, compute units, and their associated cabling and racks, can be as heavy as a 150 kg combined. Furthermore, having a large amount of space available for the on-board compute units is desirable, since this allows more on-board compute units to be installed and utilized.

The desire for maximized space for on-board compute units means that compute units are usually stowed in the back of an autonomous or semi-autonomous vehicle. This is particularly the case for autonomous vehicles including, for example, a sports-utility vehicle (SUV) body type, a minivan body type, or other similar body type. Such body types generally have a large amount of available volume in the back portion of the vehicle. Placing the compute units in the back of these vehicles generally positions the compute units between the fuel tank of the vehicle and the rear of the vehicle. Moreover, the mass of the compute units means that they would have considerable momentum in the event of sudden vehicle deceleration or a rear collision event. The momentum of the compute units would therefore present the possibility of impacting the vehicle's fuel tank, passengers, or other sensitive systems or components of the vehicle, as the compute unit would be potentially shifted into the forward portion of the vehicle. Indeed, while the present techniques are henceforth discussed primarily with respect to vehicles including the on-board compute unit placed inside the rear portion of the vehicle, it should be appreciated that, in other embodiments, the on-board compute unit may be placed in any space or compartment (e.g., an underneath compartment, a front trunk space, a frontward compartment, a sideward compartment, and so forth) of the vehicle (or other similar systems utilizing on-board compute units) suitable for the stowage of sensitive computing circuitry and that also corresponds to a potential collision area or crumple zone of the vehicle. For example, in an embodiment in which the vehicle includes a semi-trailer truck (e.g., 18-wheeler) body type, the on-board compute unit may be placed, for example, inside the crew cabin of the truck, inside or underneath a frontward or sideward panel of the truck, on the passenger side of the cockpit of the truck, or positioned in between the semi-trailer truck and the towing trailer, for example. Thus, it should be appreciated that the present techniques may be applied to any of various vehicle body types (e.g., cars, trucks, vans, buses, semi-trailer trucks, trains, tractors, forklifts, construction vehicles and equipment, drones, aircrafts, watercrafts, spacecrafts, and so forth) and on-board compute unit positionings and configurations. In this way, the present techniques may ensure safe collisions across various vehicle body types and configurations and/or across various other systems utilizing on-board compute units.

Figure 1A:
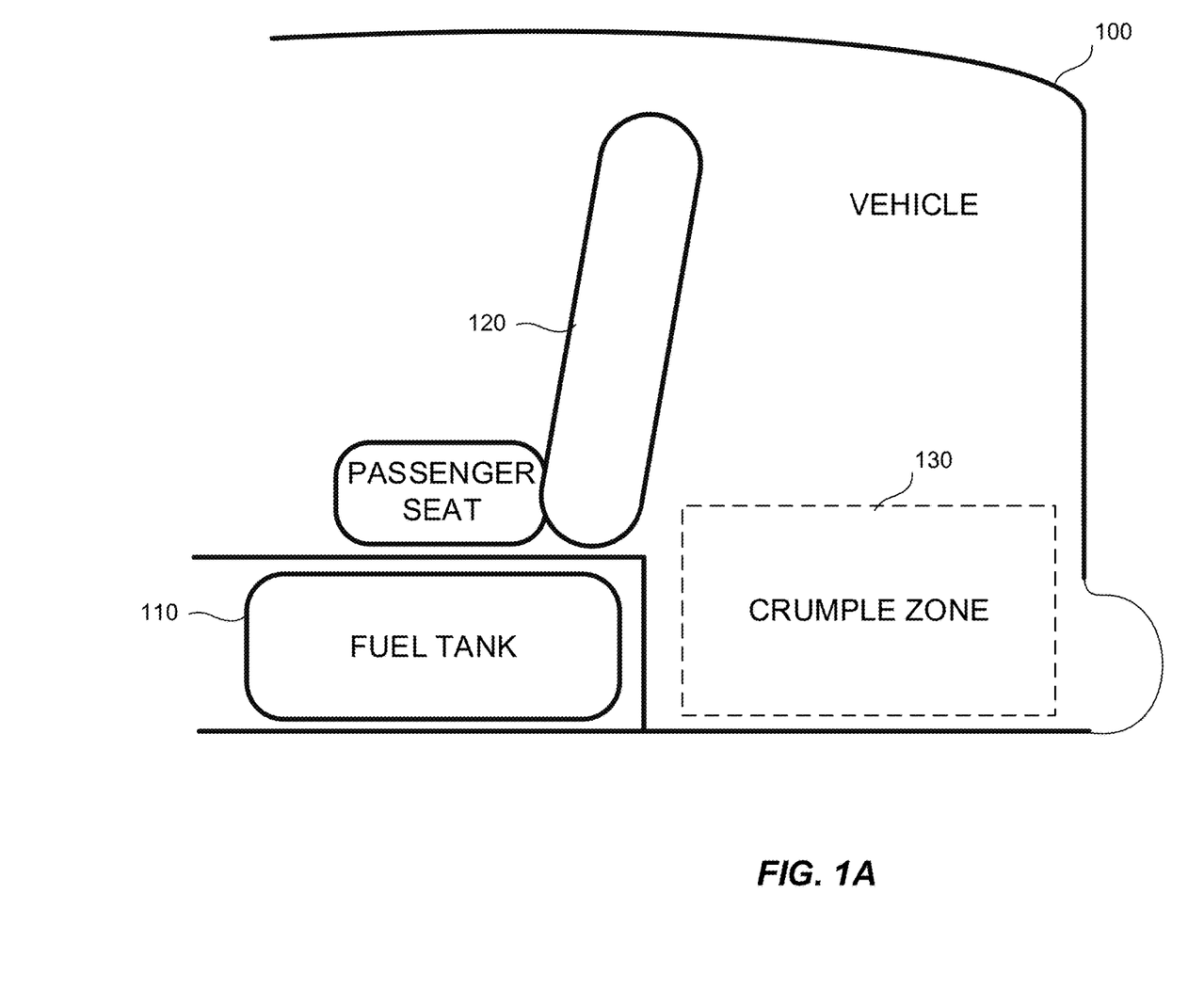
FIGS. 1A and 1B illustrate a simplified cross-section of the rear compartment of a vehicle and the intended function of a crumple zone when the vehicle is struck by another vehicle from behind.

FIG. 1A illustrates a simplified cross-section of the rear compartment of a vehicle 100. The vehicle 100 may have a fuel tank 110 that is positioned under a row of passenger seats 120. The rear end of the vehicle 100 may be a storage compartment. The area between the back end of the fuel tank 110 and/or seats 120 may be a crumple zone 130 that is engineered to crumple in a predictable manner when a lateral force is applied to it (e.g., when the vehicle 100 is rear-ended by another vehicle). The crumpling of the vehicle's structure around the crumple zone 130 is designed to absorb as much of the energy from the lateral force, thereby preventing the energy from being transferred to other parts of the vehicle 100 and damaging the fuel tank 110, passengers, or other sensitive or safety critical components of the vehicle.

Figure 1B:
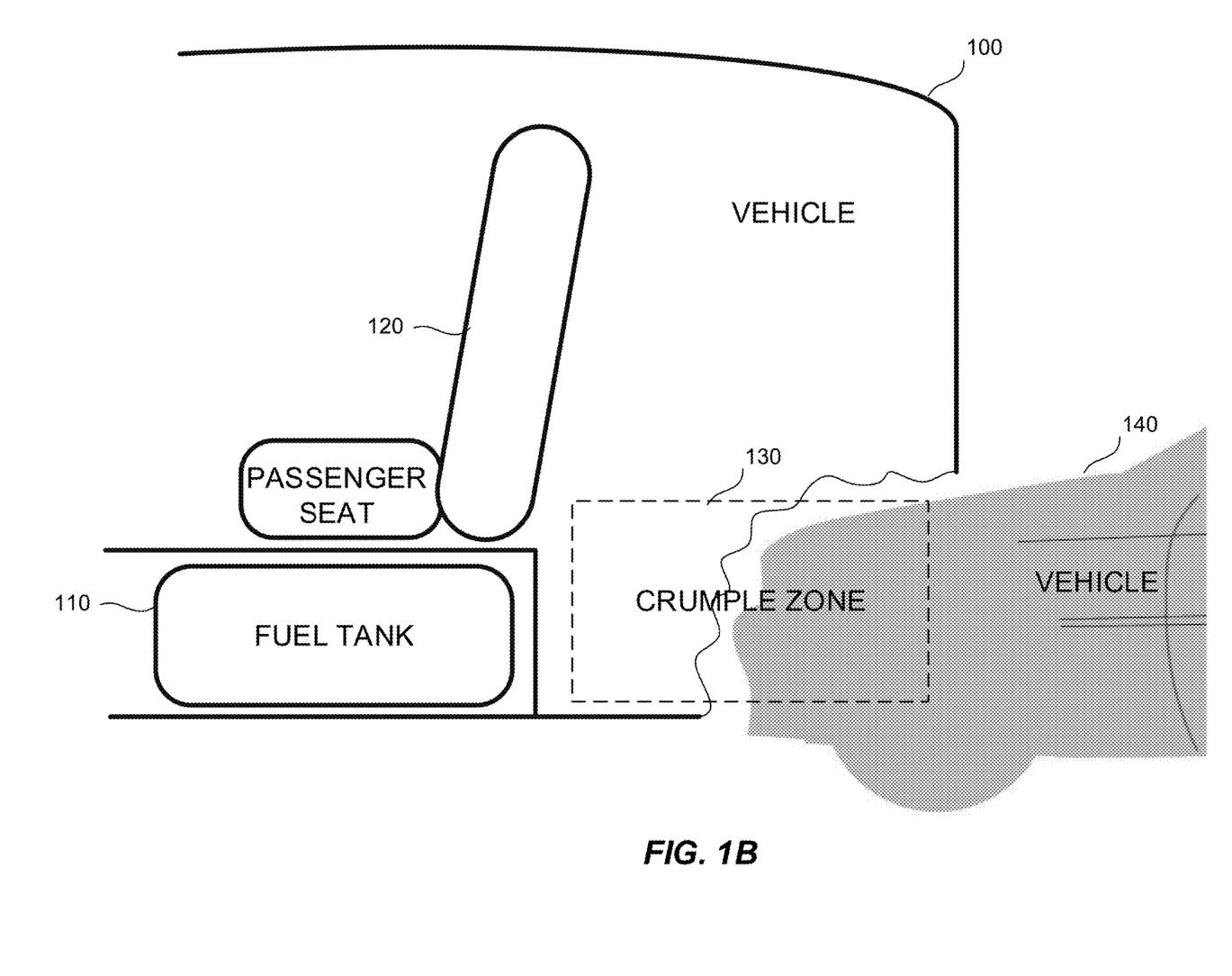

FIG. 1B illustrates an example of the intended function of the crumple zone 130 when the vehicle 100 is struck by another vehicle 140 from behind. The structural material of the vehicle 100 in the crumple zone 130 is designed so that its deformation avoids the puncturing of the fuel tank 110 or other similar safety critical component in the event of a lateral or rear-end impact of the vehicle. The crumple zone allows, for example, the force of the collision to be shunted away from the fuel tank and prevents the spillage and possible ignition of the fuel. In this manner, the crumple zone ensures the integrity of the fuel tank or other similar safety critical component and increases the overall safety of the vehicle.

Figure 2A:
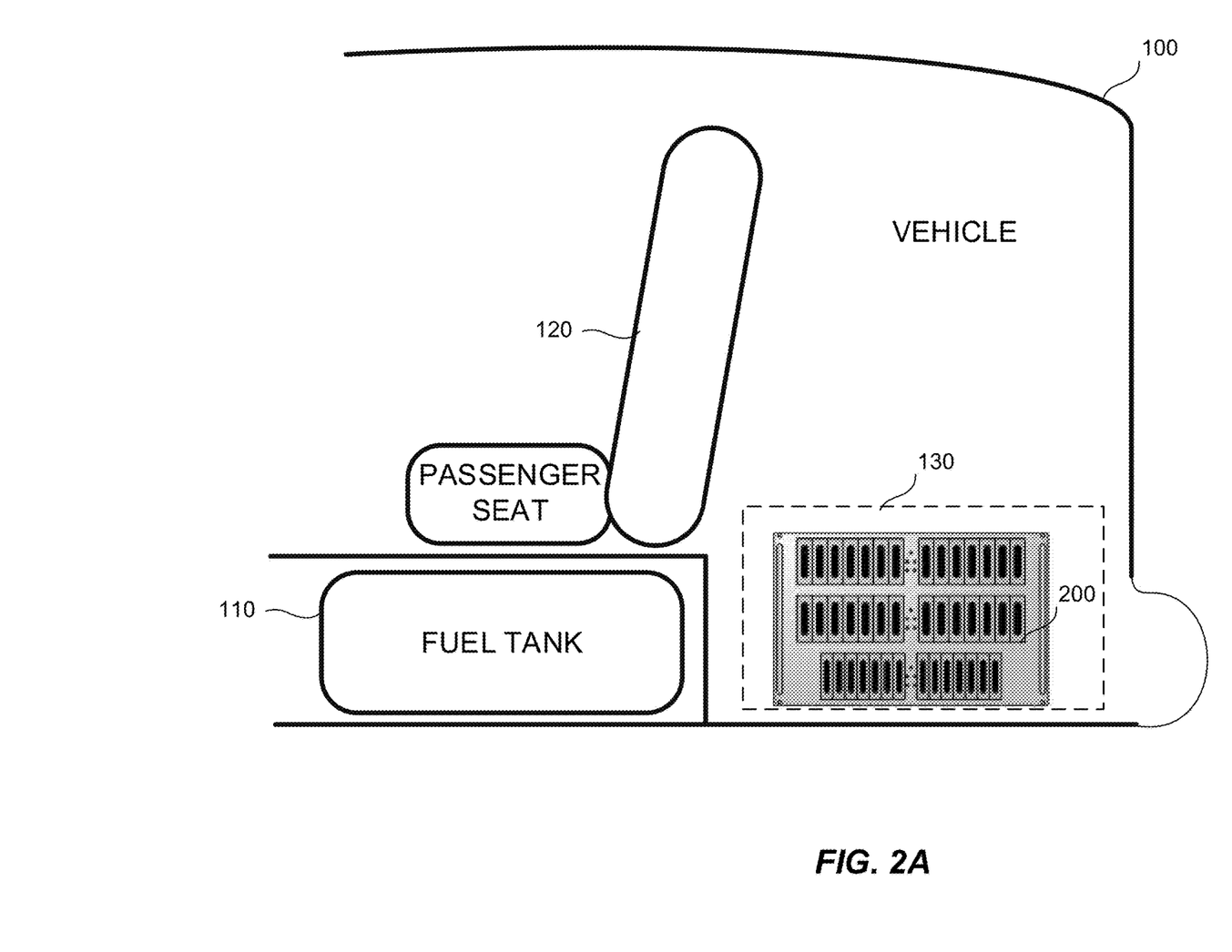
FIGS. 2A and 2B illustrate the placement of a compute unit in the rear compartment of a vehicle and the effect on the crumple zone.
Figure 2B:
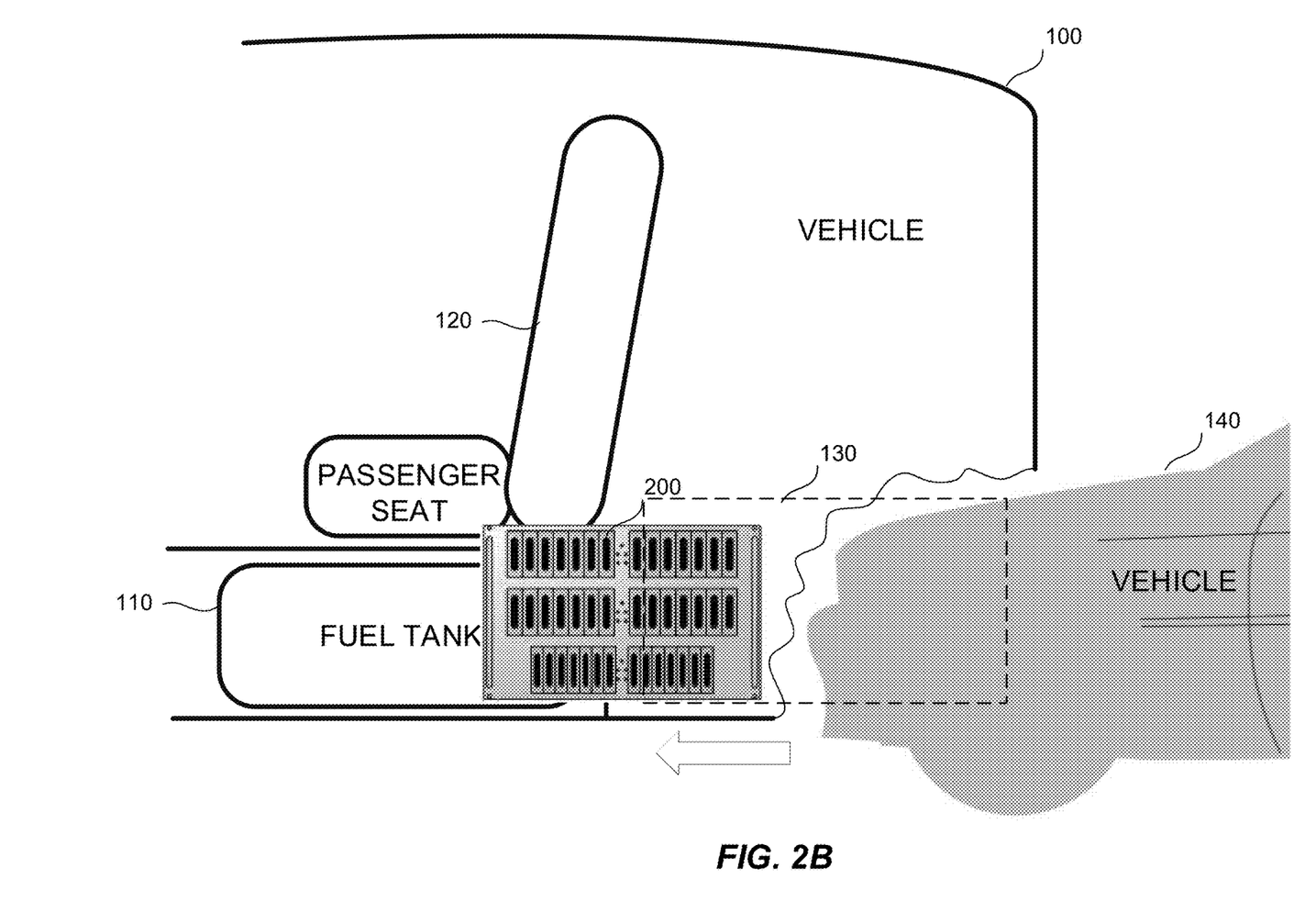

For autonomous or semi-autonomous vehicles that utilize high-performance on-board computation capabilities, a massive compute unit is to be stowed. The natural place to stow the compute unit is in the storage compartment of the vehicle. However, as shown in FIG. 2A, placing the compute unit 200 in the storage compartment of the vehicle would result in, for example, the vehicle's crumple zone 130 to be occupied by the massive and rigid compute unit 200. As shown in FIG. 2B, when the vehicle 100 collides with another vehicle 140, the structure of the vehicle 100 around the crumple zone 130 would crumple as intended, but the compute unit 200 would not. The result is that the compute unit 200 may be pushed forward by the impact and damage the fuel tank 110 or other similar safety critical component.

Therefore, a system is provided for safely storing on-board compute units in the rear of an autonomous or semi-autonomous vehicle. The design of the storage system includes as design considerations: a) fuel tank integrity, and b) passenger safety. Furthermore, the storage system mechanically connects to the body of the vehicle in a way that prevents the system from mechanically vibrating due to time-varying mechanical forces transmitted from the body of the vehicle (e.g. road and engine vibrations). Mechanical vibration of a structure is generally prevented by clamping the structure to fixed supports in multiple locations. This has the effect of moving the mechanical resonance modes of the structure to high frequencies, where resonant displacements are less damaging and less noticeable. In the case of a compute-unit storage system, this means that the system supports are preferably connected to both the lower and upper portions of the vehicle body, giving the system a "doubly clamped" configuration which suppresses the low-frequency mechanical oscillations expected from highway driving conditions.

Figure 3:
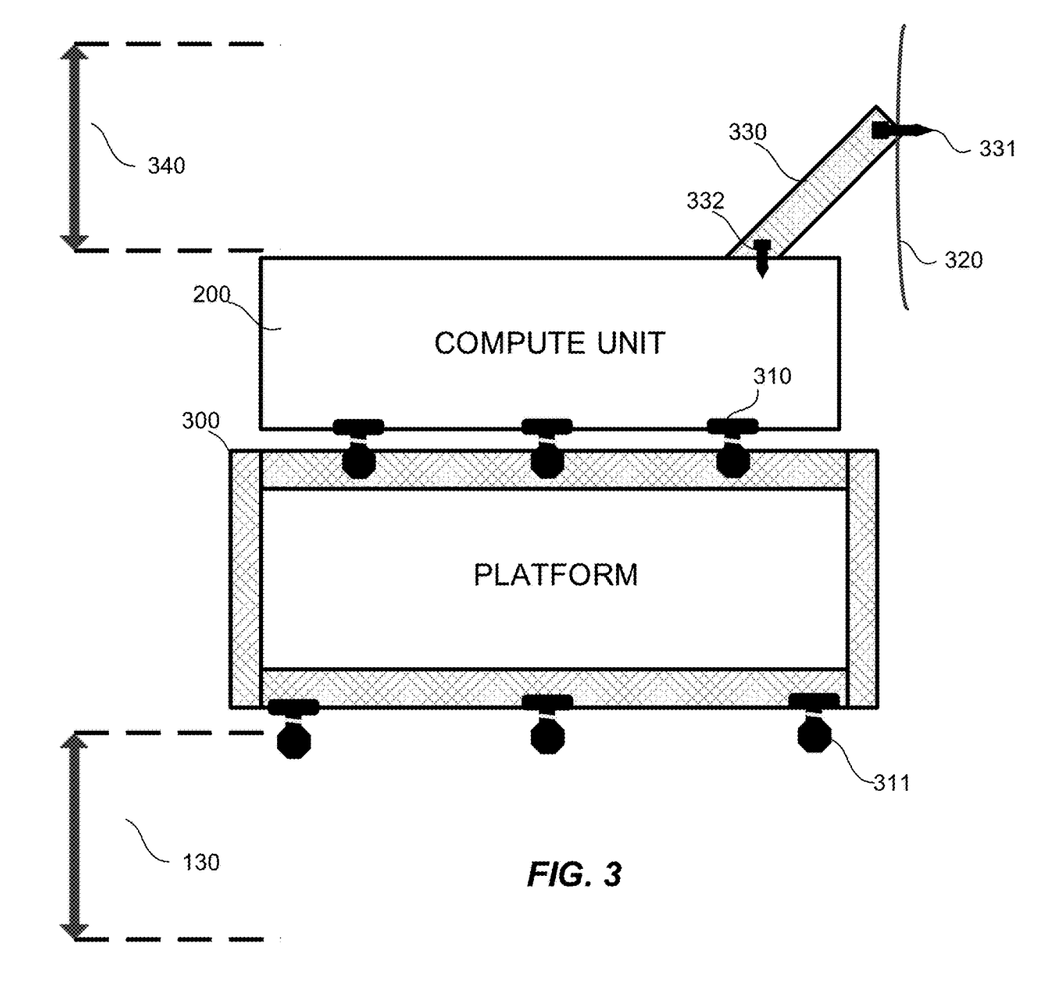
FIG. 3 illustrates an example embodiment of a safety-enhanced compute unit storage system for on-board compute units of an autonomous vehicle.

FIG. 3 illustrates an example embodiment of a safety-enhanced storage system for on-board compute units of an autonomous or semi-autonomous vehicle. In particular embodiments, the system comprises a platform 300 upon which are secured one or more compute units 200. The compute units 200 may be secured to the platform 300 using shear fasteners 310. The shear fasteners 310 are designed to join or affix objects together, but they are further designed to allow a specific outcome to occur once a predetermined force is applied. These design considerations may be satisfied regardless of the particular form taken by the shear fasteners 310. For example, the shear fasteners 310 could take the form of straps, screws, bolts, pins, or hook-and-loop fasteners (e.g. Velcro®, adhesive, tape, and so forth). In particular embodiments, the shear fasteners 310 used may break apart upon a lateral force caused by a collision (e.g., the vehicle 100 being potentially rear-ended by another vehicle 140), allowing the compute unit 200 and the platform 300 to be detached.

In particular embodiments, the platform 300 may be collapsible, exhibit controlled fracture, or otherwise exhibit large deformation without fracture under a range of applied mechanical forces. For example, the platform 300 may be constructed to have a load-bearing threshold that exceeds the weight of the compute unit 200 but would collapse upon sustaining a lateral force that is sufficient to cause the shear fasteners 310 to break. The platform 300 may be constructed using a variety of materials, such as, but not limited to plastic, wood, metal, etc.

In particular embodiments, the lower portion of the compute unit storage platform 300 may be mechanically secured to the vehicle, such as the vehicle chassis, cabin floor, or upper portion of the trunk. In some embodiments, the platform 300 may be secured to the vehicle using regular fasteners that would not shear (e.g., nuts and bolts). In other embodiments, the platform 300 may be secured to the vehicle using shear fasteners 311, similar to the fasteners 310 used to secure the compute unit 200 to the platform 300. The shear joints 310 may be designed to fracture, decouple, split or otherwise disconnect beyond a certain amount of applied lateral force. The shear joints may be shear bolts, welds, hook-and-loop fasteners, rubber connectors, adhesive strips, magnetic couplers, or electrostatic couplers. Using shear fasteners 311 allows the platform to detach from the vehicle 100 in the event of a collision, which could allow the platform 300 to crumple more easily.

In particular embodiments, the compute unit storage system may include one or more rigid connections 330 for securing the compute unit 200 to an upper part of the vehicle body 320. The upper portion of the vehicle body 320 may be, for example, the cabin interior ceiling, cabin interior side walls, vehicle roof, C-pillar, or D-pillar. The rigid connections 330 may be one or more structural members, with no designed deformation or fracture mode, and would be expected to behave as rigid bodies or bodies with small deformation under normal circumstances. The rigid connection 330 may be attached to the vehicle body 320 using a fastener 331 that is not designed to shear. The rigid connection 330 may similarly be fastened to the compute unit 200 via another fastener 332. The rigid connection 330 not only serves the purpose of better securing the compute unit 200 in normal vehicle operations, it also serves to help the compute unit 200 detach from the platform 300 in the event of a collision.

In particular embodiments, the top surface of the compute units 200 stowed in the storage system would be below a vertical zone 340 expected to comprise the range of vertical positions where the passengers would be expected to occupy. For example, this zone 340 may comprise the vertical positions of the headrests of the passenger seats. As an alternative example, this zone 340 may be defined as the range of vertical positions above the minimum height of the passenger seats. This would, for example, prevent the compute units from projecting forward and potentially colliding and/or causing harm with passengers that may be seated near the compute unit in the event of a rear impact of the vehicle.

In particular embodiments, the bottom extent of the compute unit storage system is designed to be above the vertical position of the top of the crumple zone 130. For example, the compute units 200 and their supporting platforms would be located above the crumple zone 130 by some finite distance. For example, this distance would be sufficient to allow the crumple zone 130 to deform predictably, without interference from the storage system, in the event of a rear or lateral impact on the vehicle. In particular embodiments, the shear joints of the storage system would be in contact or connected to the top boundary of the crumple zone 130.

Figure 4A:
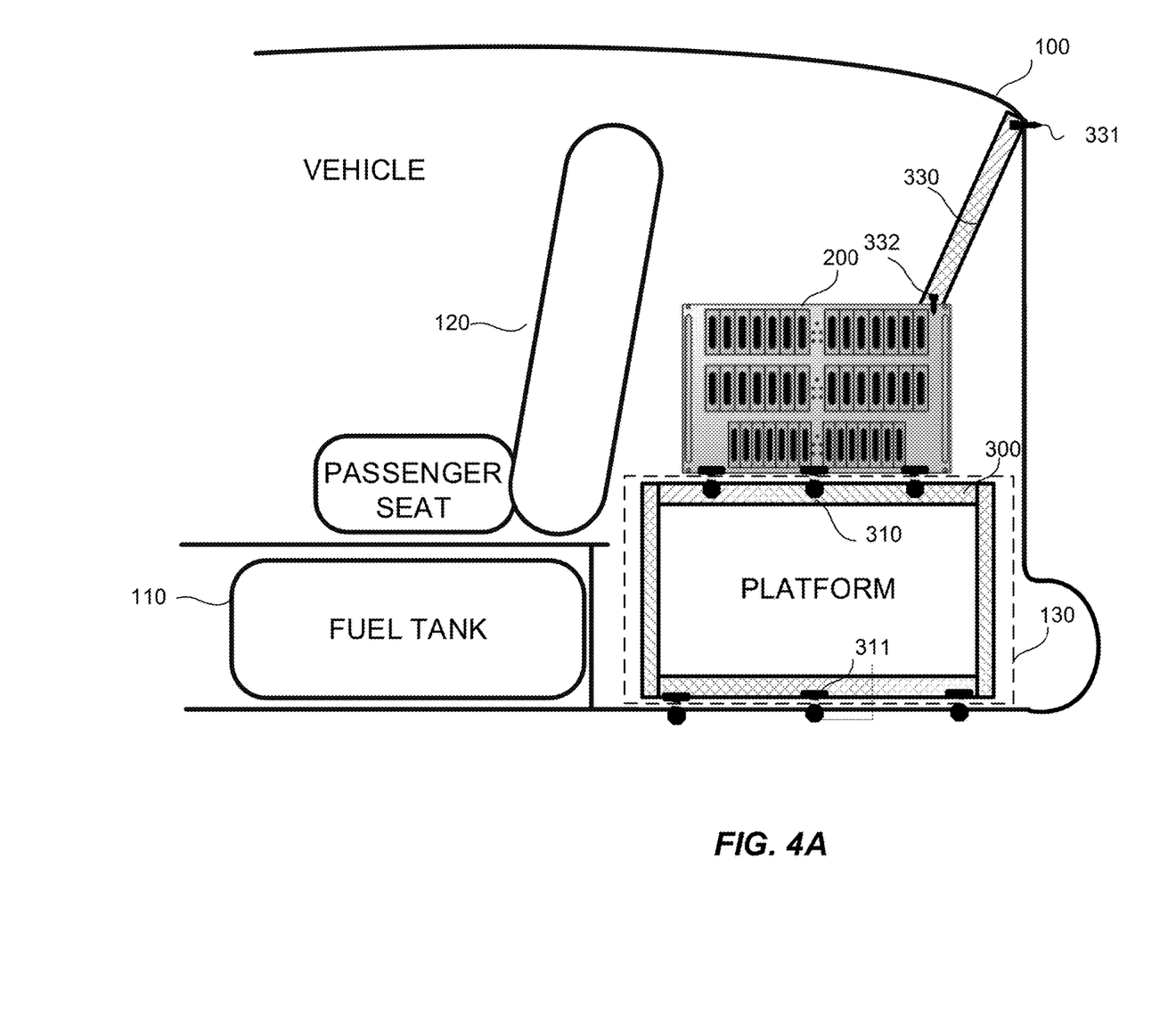
FIGS. 4A and 4B illustrate an example embodiment of an installation of a compute unit storage system in an autonomous vehicle and its safety benefits in the event of a rear impact.

FIG. 4A illustrates an example installation of the compute unit storage system in an autonomous vehicle. As an example, the compute unit storage system 200 may be installed in the rear storage compartment of an autonomous vehicle 100, located behind the rear passenger seats 120 and fuel tank 110. The compute unit 200 may be elevated above the crumple zone 130 of the vehicle by using the storage platform 300. The bottom of the storage platform 300 may be secured to the vehicle 100 (e.g., using shear fasteners 311). Even though the platform 300 may occupy the same space as the crumple zone 130, it is designed to not impinge, violate, or otherwise interfere with the collapse mode of the crumple zone 130 in the case of a lateral impact against the vehicle 100. The compute unit 200 may be attached to the platform 300 using shear fasteners 310, so that the compute unit 200 would detach from the platform 300 upon impact. The rigid connector 330 would hold the compute unit 200 against the upper portion of the vehicle to prevent the compute unit 200 from moving forward with the platform and further ensure that the shear fasteners 310 break as intended. As shown, in particular embodiments, the crumple zone 130 is located below the compute unit 200 so that it could crumple as intended during collisions to ensure that the fuel tank 110 is not damage.

In particular embodiments, the minimum height of the passenger seats 120 is located above the top surface of the stowed compute units 200. In other words, the compute units 200 are positioned below a vertical threshold defined by the passenger seats 120. The distance between the minimum height (e.g., at least 6 inches, at least 12 inches, at least 18 inches, at least 24 inches, etc.) of the seat 120 and the compute unit 200 may be such that any lateral movement of the compute unit 200 would not result in the compute unit 200 being projected forward into the passenger compartment.

Figure 4B:
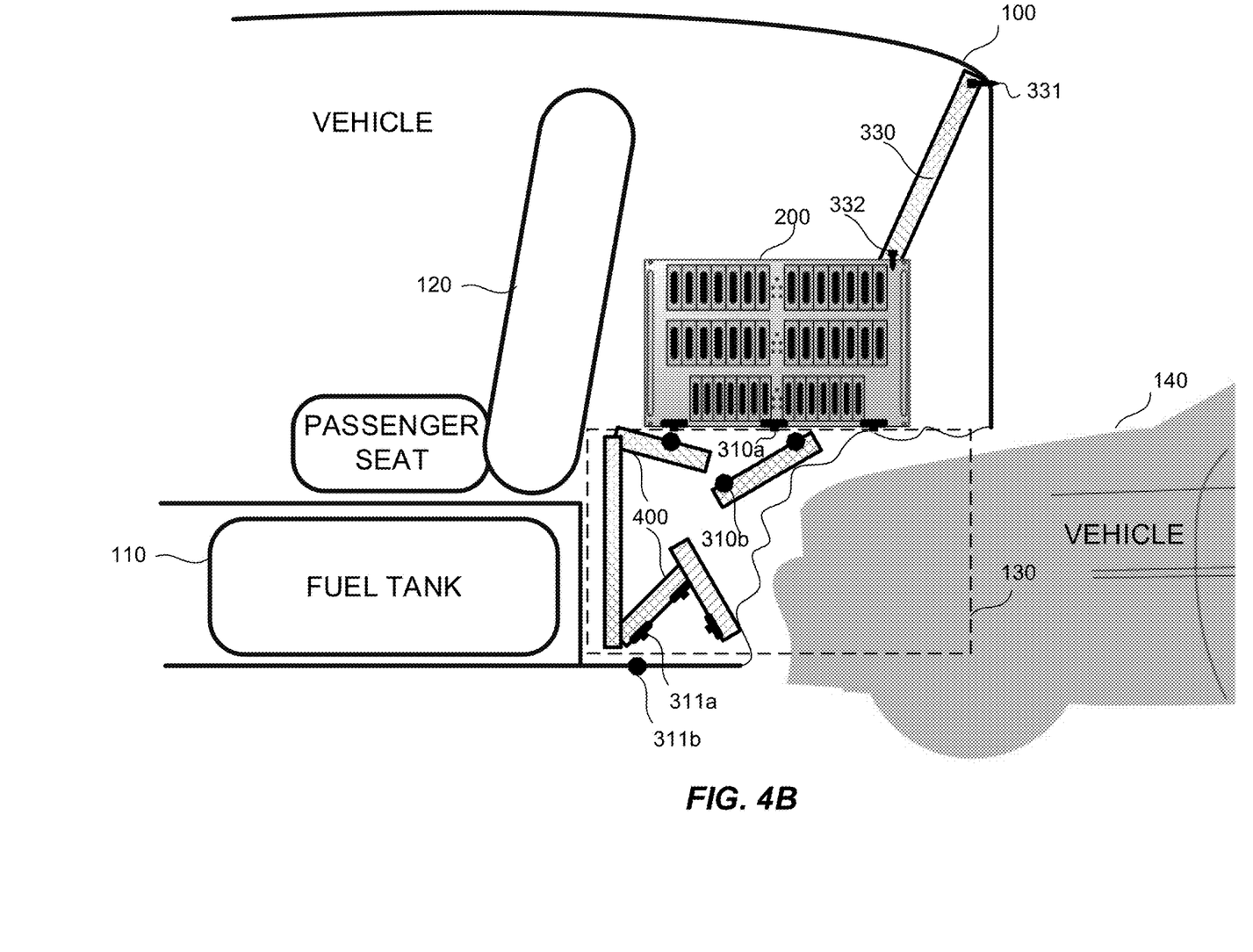

FIG. 4B illustrates an example installation of the compute unit storage system in an autonomous vehicle 100 experiencing a rear-impact from another vehicle 140. As an example, another vehicle 140 impacts the rear of the host vehicle 100, causing the crumple zone 130 to collapse in the designed locations. The platform 300 shown in FIG. 4A crumples due to the impact, leaving the platform fragments 400 shown in FIG. 4B. The crumpled platform 400 prevents it from hampering with the crumple design of the vehicle's crumple zone 130, thereby maintaining the fuel tank's 110 integrity and passenger safety. Additionally, as a result of the lateral force, the shear fasteners 310 and 311 shown in FIG. 4A breaks. As an example, one shear fastener 310 breaks into two parts, an upper part 310a and a lower part 310b. Similarly, one of the shear fasteners 311 is shown to break into an upper part 311a and a lower part 311b. The breaking of the shear fasteners 310 and 311 allows the platform 400 to be decoupled from the compute unit 200 and the vehicle 100 during the collision and prevents the platform 400 from obtaining unwanted structural support from the compute unit 200 and the vehicle 100 when it is desirable for the platform 400 to crumple within the crumple zone 130.

Another design goal of the present system is to prevent the compute unit 200 from, for example, projecting forward in the event of a collision and damaging the fuel tank 110 or other similar safety critical component or potentially colliding with the passengers. The decoupling of the compute unit 200 from the platform 400 minimizes the amount of energy that is transferred from the other vehicle 140 to the compute unit 200, which reduces the likelihood of the compute unit 200 from projecting forward. Since the compute unit 200 is above the crumple zone 130, it would not be directly pushed into the fuel tank 110 or other similar safety critical component. Further, the rigid connection 330 between the compute unit 200 and the host vehicle 100 is maintained to ensure that the compute unit 200 does not, for example, project forward and break away from the platform 400. In this manner, at least two critical safety constraints are satisfied by the compute unit storage system in the case of a lateral or rear impact. Indeed, as generally discussed above with respect to FIGS. 3, 4A, and 4B, the present techniques of providing a safety-enhanced storage system for on-board compute units of vehicles (or other similar systems utilizing on-board compute units) may ensure the integrity of safety critical components (e.g., fuel system components, exhaust system components, batteries, radiator and similar temperature control components, fluid storage and control components, refrigerants and similar automotive chemical compounds, heated wiring, and so forth) of the vehicle 100 and to increase the overall safety of the vehicle 100 in the event of a collision. Additionally, while the present techniques are discussed herein primarily with respect to autonomous or semi-autonomous vehicles including the on-board compute unit 200 placed inside the rear portion of the vehicle 100, it should be appreciated that, in other embodiments, the on-board compute unit 200 may be place in any space or compartment (e.g., an underneath compartment, a front trunk space, a frontward compartment, a sideward compartment, and so forth) of the vehicle 100 suitable for the stowage of sensitive computing circuitry and that also corresponds to a potential collision area or crumple zone 130 of the vehicle 100.

For example, in an embodiment in which the vehicle 100 includes a semi-trailer truck (e.g., 18-wheeler) body type, the on-board compute unit 200 may be placed, for example, inside the crew cabin of the truck, inside or underneath a frontward or sideward panel of the truck, on the passenger side of the cockpit of the truck, or positioned in between the semi-trailer truck and the towing trailer, for example. Thus, it should be appreciated that the present techniques may be applied to any of various vehicle body types (e.g., cars, trucks, vans, buses, semi-trailer trucks, trains, tractors, forklifts, construction vehicles and equipment, drones, aircrafts, watercrafts, spacecrafts, and so forth) and on-board compute unit positionings and configurations. In this way, the present techniques may ensure safe collisions across various vehicle body types and configurations and/or across various other systems utilizing on-board compute units.

As another illustration of the present techniques applied in an embodiment in which, for example, a trunk compartment, and, by extension, the associated crumple zone 130 of the vehicle 100 is constructed at or near the front of the vehicle 100, the aforementioned platform 300 securing the compute unit 200 may be suited for potential frontward collisions (e.g., fender-bender, head-on collision) involving the vehicle 100. In such an embodiment, the disposed platform 300 may be constructed to include, for example, an impulse threshold (e.g., change in forward momentum), such that the disposed platform 300 will collapse upon the vehicle 100 being subjected to an impulse greater than the threshold in the case of a potential frontward collision (e.g., fender-bender, head-on collision) involving the vehicle 100. As thus illustrated, the present techniques may ensure safe collisions, regardless as to where inside the vehicle 100 or other similar system utilizing an on-board compute unit 200 is placed.

Figure 5:
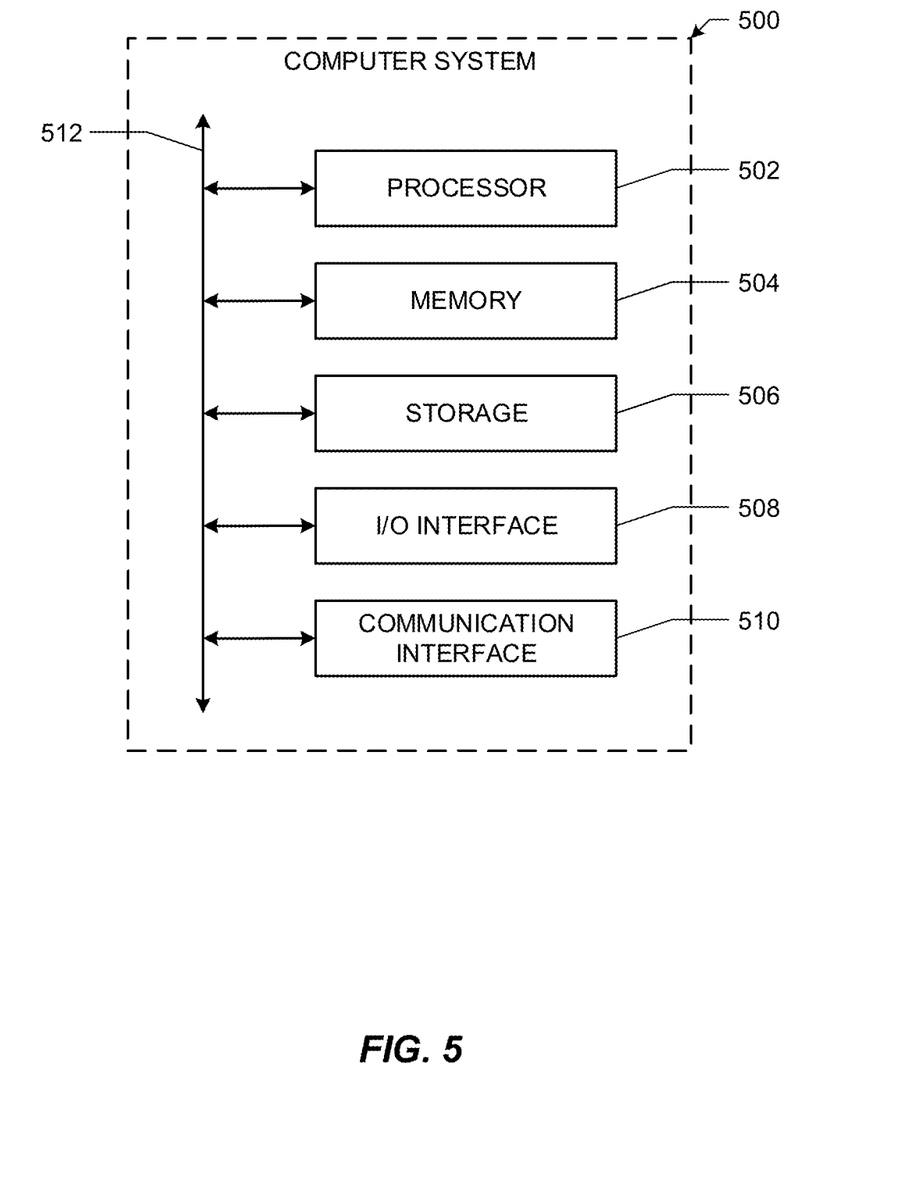
FIG. 5 illustrates an example of a computing system.

FIG. 5 illustrates an example computer system 500. In particular embodiments, one or more computer systems 500 perform one or more steps of one or more methods described or illustrated herein. In particular embodiments, one or more computer systems 500 provide the functionalities described or illustrated herein. In particular embodiments, software running on one or more computer systems 500 performs one or more steps of one or more methods described or illustrated herein or provides the functionalities described or illustrated herein. Particular embodiments include one or more portions of one or more computer systems 500. Herein, a reference to a computer system may encompass a computing device, and vice versa, where appropriate. Moreover, a reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 that are to be operated on by computer instructions; the results of previous instructions executed by processor 502 that are accessible to subsequent instructions or for writing to memory 504 or storage 506; or any other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs), be a multi-core processor, or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described in further detail below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A compute unit storage system for a vehicle, comprising:
    a platform configured to support a compute unit of the vehicle to avoid a crumple zone of the vehicle, the platform forming a box that raises the compute unit above the crumple zone, wherein the crumple zone of the vehicle is configured to crumple when colliding with an object;
    one or more shear fasteners configured to fasten the compute unit to the platform, wherein the one or more shear fasteners are configured to break in a predetermined direction in response to a predetermined amount of lateral force, and wherein breakage of the one or more shear fasteners decouples the compute unit from the platform in a controlled direction; and
    a connector configured to connect the compute unit to a portion of the vehicle outside of the crumple zone that is a structural member of the vehicle located at a vertical position above and outside of the crumple zone, wherein the connector maintains the connection between the compute unit and the portion when the shear fasteners break.

2. The compute unit storage system of claim 1, wherein the platform is configured to be placed in the crumple zone of the vehicle.

3. The compute unit storage system of claim 2, wherein the platform is configured to crumple when colliding with the object.

4. The compute unit storage system of claim 1, wherein the one or more shear fasteners are configured to break into a first part and a second part in response to the predetermined amount of lateral force.

5. The compute unit storage system of claim 1, wherein the one or more shear fasteners are configured to break in the predetermined direction in response to a lateral force originating from behind the vehicle and projecting towards a front of the vehicle.

6. The compute unit storage system of claim 1, wherein the one or more shear fasteners are configured to break in the predetermined direction in response to a lateral force originating from in front of the vehicle and projecting towards a rear of the vehicle.

7. The compute unit storage system of claim 1, wherein the crumple zone is configured to absorb force between a safety critical component of the vehicle and an exterior body of the vehicle.

8. The compute unit storage system of claim 7, wherein the platform is configured to support the compute unit of the vehicle to be above a height of a top portion of the safety critical component.

9. The compute unit storage system of claim 1, wherein the platform is configured to support the compute unit of the vehicle to be below a height of a passenger seat of the vehicle.

10. The compute unit storage system of claim 1, wherein the connector is configured to maintain the connection between the compute unit and the portion of the vehicle when a collision causes the crumple zone to crumple.

11. The compute unit storage system of claim 1, wherein the connector is configured to maintain the connection between the compute unit and the portion of the vehicle when the one or more shear fasteners break in the predetermined direction in response to the predetermined amount of lateral force.

12. The compute unit storage system of claim 1, wherein the one or more shear fasteners includes an adhesive, a hook-and-loop fastener, or a magnetic contact configured to decouple in response to the predetermined amount of lateral force.

13. The compute unit storage system of claim 1, wherein the one or more shear fasteners includes a shear bolt configured to fracture in response to the predetermined amount of lateral force.

14. The compute unit storage system of claim 1, wherein the compute unit is stowed within a rearward storage compartment of the vehicle.

15. The compute unit storage system of claim 1, wherein the compute unit is stowed within a frontward storage compartment of the vehicle.

16. The compute unit storage system of claim 1, wherein the compute unit is stowed within a sideward storage compartment of the vehicle.

17. A method of providing a compute unit storage system for a vehicle, comprising:
- providing a platform configured to support a compute unit of the vehicle to avoid a crumple zone of the vehicle, the platform forming a box that raises the compute unit above the crumple zone, wherein the crumple zone of the vehicle is configured to crumple when colliding with an object;
- providing one or more shear fasteners configured to fasten the compute unit to the platform, wherein the one or more shear fasteners are configured to break in a predetermined direction in response to a predetermined amount of lateral force, wherein breakage of the one or more shear fasteners decouples the compute unit from the platform in a controlled direction; and
- providing a connector configured to connect the compute unit to a portion of the vehicle outside of the crumple zone that is a structural member of the vehicle located at a vertical position above and outside of the crumple zone, wherein the connector maintains the connection between the compute unit and the portion when the shear fasteners break.

18. A system, comprising:
- a vehicle, comprising:
  - a platform configured to support a compute unit of the vehicle to avoid a crumple zone of the vehicle, the platform forming a box that raises the compute unit above the crumple zone, wherein the crumple zone of the vehicle is configured to crumple when colliding with an object;
- one or more shear fasteners configured to fasten the compute unit to the platform, wherein the one or more shear fasteners are configured to break in a predetermined direction in response to a predetermined amount of lateral force, and wherein breakage of the one or more shear fasteners decouples the compute unit from the platform in a controlled direction; and
- a connector configured to connect the compute unit to a portion of the vehicle outside of the crumple zone that is a structural member of the vehicle located at a vertical position above and outside of the crumple zone, wherein the connector maintains the connection between the compute unit and the portion when the shear fasteners break.

* * * * *